United States Patent
Park et al.

(10) Patent No.: US 9,920,404 B2
(45) Date of Patent: Mar. 20, 2018

(54) HIGH ELASTICITY ALUMINUM ALLOY INCLUDING TITANIUM COMPOUND AND METHOD FOR PRODUCING THE SAME

(71) Applicant: Hyundai Motor Company, Seoul (KR)

(72) Inventors: Hoon Mo Park, Gyeonggi-do (KR); Hoo Dam Lee, Seoul (KR)

(73) Assignee: Hyundai Motor Company, Seoul (KR)

(*) Notice: Subject to any disclaimer, the term of this patent is extended or adjusted under 35 U.S.C. 154(b) by 636 days.

(21) Appl. No.: 14/496,257

(22) Filed: Sep. 25, 2014

(65) Prior Publication Data

US 2015/0240333 A1 Aug. 27, 2015

(30) Foreign Application Priority Data

Feb. 27, 2014 (KR) .................. 10-2014-0022982

(51) Int. Cl.
| | | |
|---|---|---|
| C22C 32/00 | (2006.01) |
| B62D 29/00 | (2006.01) |
| C22B 9/02 | (2006.01) |
| C22B 21/06 | (2006.01) |
| C22C 1/02 | (2006.01) |
| C22C 21/02 | (2006.01) |
| C22C 1/03 | (2006.01) |

(52) U.S. Cl.
CPC ........ *C22C 32/0073* (2013.01); *B62D 29/008* (2013.01); *C22B 9/02* (2013.01); *C22B 21/06* (2013.01); *C22C 1/02* (2013.01); *C22C 1/026* (2013.01); *C22C 1/03* (2013.01); *C22C 21/02* (2013.01); *C22C 2202/00* (2013.01)

(58) Field of Classification Search
CPC .. C22C 1/02; C22C 1/026; C22C 1/03; C22C 21/02; C22C 32/0073; C22C 2202/00; C22C 1/0073; C22B 9/02; C22B 21/06; B62D 29/008
See application file for complete search history.

(56) References Cited

U.S. PATENT DOCUMENTS

| | | | | |
|---|---|---|---|---|
| 2008/0245447 | A1* | 10/2008 | Birol ................... | C22C 1/03 148/437 |
| 2013/0136651 | A1* | 5/2013 | Park ..................... | C22F 1/053 420/532 |

FOREIGN PATENT DOCUMENTS

| | | |
|---|---|---|
| CN | 1542151 A | 11/2004 |
| CN | 101300367 A | 11/2008 |
| CN | 102676885 A | 9/2012 |
| DE | 202006006518 U1 * 9/2006 | ........... B22D 21/007 |

(Continued)

OTHER PUBLICATIONS

Nagai et al., English machine translation of JP 04-202737A, Jul. 1992, p. 1-7.*

(Continued)

*Primary Examiner* — Jessee Roe
(74) *Attorney, Agent, or Firm* — Mintz Levin Cohn Ferris Glovsky and Popeo, P.C.; Peter F. Corless

(57) ABSTRACT

Disclosed is a high elasticity aluminum alloy including a titanium compound. In particular, the high elasticity aluminum alloy includes Ti and B and the composition ratio of Ti and B is from about 3.5 to about 6:1. In addition, B is included in an amount of about 0.5 to 2 wt % in the high elasticity aluminum alloy, and both of $Al_3Ti$ and $TiB_2$ phases are included therein as a reinforcement phase. Methods for producing the high elasticity aluminum alloy are also disclosed.

10 Claims, 3 Drawing Sheets

(56) References Cited

FOREIGN PATENT DOCUMENTS

| JP | 04202737 A | * | 7/1992 | ............. C22C 21/12 |
|----|------------|---|--------|--------------------------|
| JP | 2000-265231 A | | 9/2000 | |
| JP | 2004-278458 A | | 10/2004 | |
| JP | 2009-515041 A | | 4/2009 | |
| JP | 2009132985 A | | 6/2009 | |
| JP | 2012237061 A | | 12/2012 | |
| KR | 10-2012-0059256 | | 6/2012 | |
| KR | 10-2013-0058997 | | 6/2013 | |
| KR | 10-2013-0058998 | | 6/2013 | |
| KR | 10-2014-0021396 A | | 2/2014 | |

OTHER PUBLICATIONS

Tonn et al., English machine translation of DE 202006006518U1, Sep. 2006, p. 1-12.*

* cited by examiner

HIGH ELASTICITY ALUMINUM ALLOY INCLUDING TITANIUM COMPOUND AND METHOD FOR PRODUCING THE SAME

CROSS REFERENCE TO RELATED APPLICATION

The present application claims priority of Korean Patent Application Number 10-2014-0022982 filed on Feb. 27, 2014, the entire contents of which application are incorporated herein for all purposes by this reference.

TECHNICAL FIELD

The present invention relates to a high elasticity aluminum alloy and a method for producing the high elasticity aluminum alloy. Particularly, the high elasticity aluminum alloy includes a titanium compound that comprises both titanium trialuminide ($Al_3Ti$) and titanium diboride ($TiB_2$) phases as reinforcement phases, to thereby significantly improve elasticity of the aluminum alloy and maintaining castability.

BACKGROUND

The present invention relates to a high elasticity aluminum material for casting for improving strength and noise, vibration, and harshness (NVH) characteristics.

In the related art, in order to increase elasticity of an aluminum alloy, a reinforcement phase of a metal based compound such as carbon nanotube (CNT) and the like may be formed in a powder form. However, cost competitiveness may not be obtained. In addition, when the reinforcement phase in a powder form is applied during a casting process of an alloy, wettability with an aluminum (Al) matrix and dispersion thereof may deteriorate. Particularly, when a hyper-eutectic aluminum casting material is used, only a low pressure casting process may be applied, and processing the hyper-eutectic aluminum casting material may be difficult due to coarse Si particles.

As such, optimizing formation of a titanium based compound which may greatly contribute to improving elasticity by applying both of titanium trialuminide ($Al_3Ti$) and titanium diboride ($TiB_2$) phases as reinforcement phases and implementing a high elasticity material which may be applied to a general casting process including a high pressure casting process and have uniformity are desired to maximize elasticity and improve reproducibility.

The above descriptions of the related arts have been provided only for assisting in the understanding for the background of the present invention and should not be considered as corresponding to the related art known to those skilled in the art.

SUMMARY OF THE INVENTION

The present invention provides a high elasticity aluminum alloy and a method for producing the high elasticity aluminum alloy. In particular, the high elasticity aluminum alloy may include a titanium compound which may comprise both $Al_3Ti$ and $TiB_2$ phases as reinforcement phases to thereby increase elasticity and improve castability by decreasing a melting point of the high elasticity aluminum alloy.

In one aspect, a high elasticity aluminum alloy including a titanium compound is provided.

In an exemplary embodiment, the high elasticity aluminum alloy may include Ti and B. In particular, a composition (molar) ratio of titanium (Ti) and boron (B) may be in a range from about 3.5 to about 6:1, B may be included in an amount of about 0.5 to 2 wt % based on the total weight of the high elasticity aluminum alloy, and both of $Al_3Ti$ and $TiB_2$ phases may be included therein as a reinforcement phase.

It is understood that weight percents of the alloy components as disclosed herein are based on total weight of the high elasticity aluminum alloy, unless otherwise indicated.

In an exemplary embodiment, a high elasticity aluminum alloy including a titanium compound may include: silicon (Si) in an amount of about 5.0 to 13.0 wt %; iron (Fe) in an amount of about 0.0 to 1.3 wt %; manganese (Mn) in an amount of about 0.0 to 0.5 wt %; magnesium (Mg) in an amount of about 0.0 to 0.3 wt %; zinc (Zn) in an amount of about 0.0 to 1.0 wt %; nickel (Ni) in an amount of about 0.0 to 0.5 wt %; tin (Sn) in an amount of about 0.0 to 0.3 wt %; copper (Cu) in an amount of about 1.5 to 3.5 wt %; boron (B) in an amount of about 0.5 to 2 wt %; titanium (Ti) included such that a composition ratio of Ti and B is in a range from about 3.5 to about 6:1; and aluminum as the remainder, based on the total weight of the high elasticity aluminum alloy. In particular, both of $Al_3Ti$ and $TiB_2$ phases may be included in the high elasticity aluminum alloy as a reinforcement phase.

In an exemplary embodiment, the high elasticity aluminum alloy may consist essentially of, or consist of, or essentially consist of the above disclosed composition. The high elasticity aluminum alloy may consist essentially of, consist of, or essentially consist of: silicon (Si) in an amount of about 5.0 to 13.0 wt %; iron (Fe) in an amount of about 0.0 to 1.3 wt %; manganese (Mn) in an amount of about 0.0 to 0.5 wt %; magnesium (Mg) in an amount of about 0.0 to 0.3 wt %; zinc (Zn) in an amount of about 0.0 to 1.0 wt %; nickel (Ni) in an amount of about 0.0 to 0.5 wt %; tin (Sn) in an amount of about 0.0 to 0.3 wt %; copper (Cu) in an amount of about 1.5 to 3.5 wt %; boron (B) in an amount of about 0.5 to 2 wt %; titanium (Ti) included such that a composition (molar) ratio of Ti and B is in a range from about 3.5 to about 6:1; and aluminum as the remainder, all the above wt. % values based on the total weight of the high elasticity aluminum alloy.

In another aspect, provided is a method for producing a high elasticity aluminum alloy including a titanium compound.

In an exemplary embodiment, the method may include steps of: a charging step of charging Al, an Al—B mother alloy, an Al—Ti mother alloy, or a Ti raw material in a melting furnace such that the composition ratio of Ti and B may be in a range from about 3.5 to about 6:1 and B may be included in an amount of about 0.5 to 2 wt %; a primary stirring step of stirring molten metals such that both of $Al_3Ti$ and $TiB_2$ phases may be formed as a reinforcement phase to promote a reaction; an addition step of charging addition elements; and a secondary stirring step of stirring the molten metals such that the formed reinforcement phase may be uniformly dispersed in the molten metals.

In certain exemplary embodiment, the Al—B mother alloy may consist of about 3 to 8 wt % B and the remainder of Al.

In certain exemplary embodiment, the Al—Ti mother alloy may consist of about 5 to 10 wt % Ti and the remainder of Al.

In certain exemplary embodiment, antimony (Sb) may be included in an amount of about 0.3 wt % or less but greater than 0 wt %.

Further provided are vehicles and vehicle parts that comprise one or more of the alloys disclosed herein. Preferred are vehicle parts that comprise an alloy as disclosed herein.

Other aspects of the invention are disclosed infra.

BRIEF DESCRIPTION OF THE DRAWINGS

The above and other objects, features and advantages of the present invention will be more clearly understood from the following detailed description taken in conjunction with the accompanying drawing, in which.

DESCRIPTION OF THE EXEMPLARY EMBODIMENTS

Figure 1:
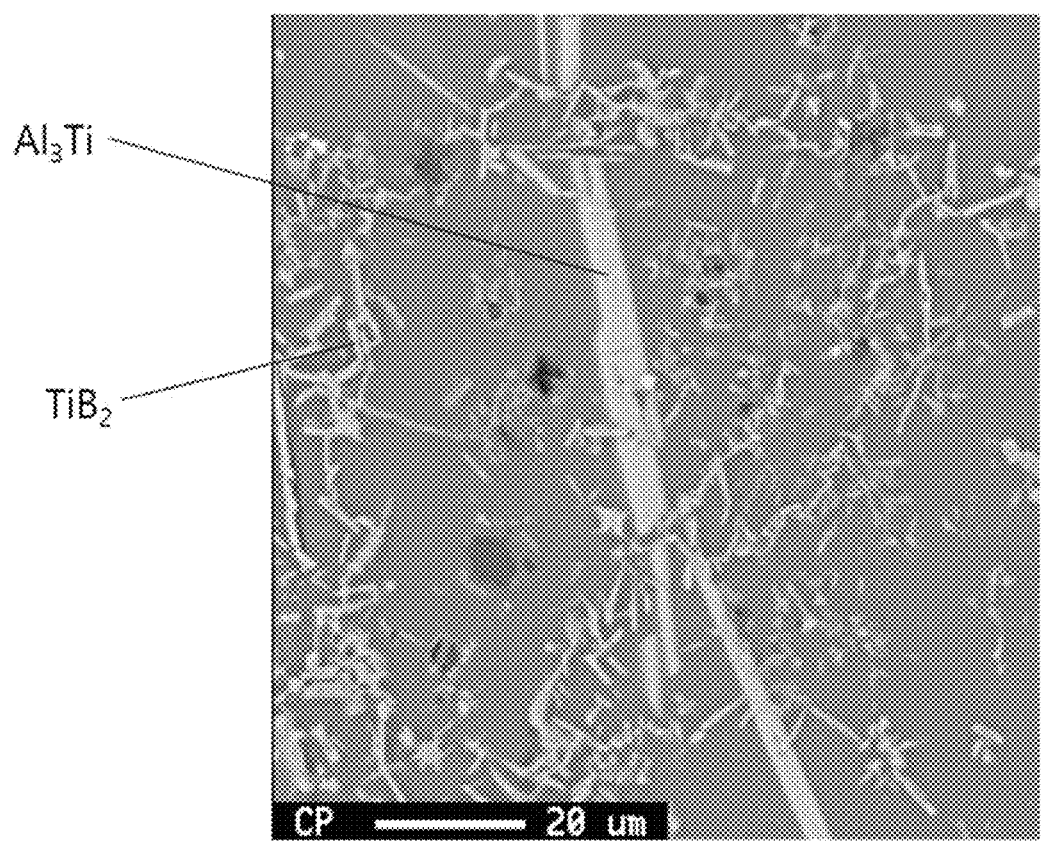
FIG. 1 shows a microscopic view of an exemplary aluminum alloy according to an exemplary embodiment of the present invention in which $Al_3Ti$ and $TiB_2$ phases are simultaneously included.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described with reference to the accompanying drawing.

The present invention provides a high elasticity aluminum alloy which may include both $Al_3Ti$ and $TiB_2$ phases as reinforcement phases, to thereby increase elasticity, improve castability by decreasing a melting point of the alloy, and suppress an inclusion and a gas defect.

In an exemplary embodiment, the high elasticity aluminum alloy may include a titanium compound. In particular, the high elasticity aluminum alloy may include boron (B) in an amount of about 0.5 to 2 wt % B and simultaneously includes the $Al_3Ti$ and $TiB_2$ phases as the reinforcement phases. The composition ratio of Ti and B may be in a range from about 3.5 to about 6:1.

In an exemplary embodiment, the high elasticity aluminum alloy may include Si in an amount of about 5 to 13 wt %, to thereby implement castability and improve elasticity. Furthermore, to the content of B may be of about 0.5 to 2 wt %, and the composition ratio of Ti and B may be from about 3.5 to about 6:1 to maximize formation of a titanium compound. Among the titanium compound, $TiB_2$ having a tensile strength of about 570 GPa and $Al_3Ti$ having a tensile strength of about 220 GPa may be the most effective components to improve elasticity, thereby configuring a basic alloy system.

Silicon (Si), as used herein, may be a main element of an aluminum alloy for casting. Silicon may influence flowability and casting quality and contribute to elasticity. When Si is included in an amount of about 13 wt % or greater, primary Si may be crystallized, such that a microstructure may become non-uniform and porosity may be negatively affected. Further, when a substantial amount of Si is added greater than a predetermined amount to overcome these problems, a continuous casting process and a post-forming process instead of a general casting process may be required. Accordingly, the content of Si may be in an amount of about 5 to 13 wt % to provide an aluminum alloy capable of being applied to general casting processes such as a high pressure casting process, a gravity casting process, a low pressure casting process and the like.

When Ti and B are included in aluminum alloys, $TiB_2$ and $Al_3Ti$ reinforcement phases which mainly contribute to elasticity may be formed. Ti and B, as used herein, may be the major elements of the present invention to provide elasticity in the present invention. When the composition ratio of Ti and B is about 3.5:1 or less, only $TiB_2$ may be formed without forming the $Al_3Ti$ phase, such that the elasticity may not be improved sufficiently. Further, when the composition ratio of Ti and B is about 6:1 or greater, the melting point may be elevated to about 800° C. or greater, such that a large amount of oxide inclusions may be generated in a molten metal when the alloy is applied to a casting process and a gas concentration in the molten metal may increase, thereby having negative influences on internal quality of a casting product.

In certain exemplary embodiments, the content of B may be at least of about 0.5 wt % or greater in order to form sufficient $TiB_2$. In addition, the content may be limited up to about 2 wt %, to thereby control the increase of the melting temperature, suppress the inclusion, control the components and the cost of a material and the like. Particularly, the content of Ti may be determined based on the composition ratio of Ti and B which may be from about 3.5 to about 6:1 in order to simultaneously form the $Al_3Ti$ and $TiB_2$ phases.

In certain exemplary embodiments, antimony (Sb) may be included in the high elasticity aluminum alloy. Antimony (Sb), as used herein, may improve a shape and a size of Si which influence elongation of a casting material but may not react with B which is one of the major components of the alloy in the present invention. Furthermore, an effect of controlling a microstructure may be obtained as compared to the case of using strontium (Sr) or the like as an existing modifier in the related art. In yet certain exemplary embodiments, the content of Sb may be up to about 0.3 wt %.

According to various exemplary embodiments of the present invention, it is appreciated that compositions of ADC12, AC4CH, and AC2B provide a range of options for the alloy composition in the invention. For example, contents of other elements such as Si, Cu, Mg, and the like, may be included in equivalent to those of ADC12, and the remainder may be Al. Accordingly, the compositions are used for high pressure casting and gravity/low pressure casting. In particular, the content of B may be of about 0.5 to 2 wt %, and the composition ratio of Ti and B may be in a range from about 3.5 to about 6:1, thereby providing the high elasticity aluminum alloy. In addition, the $Al_3Ti$ and $TiB_2$ phases may be included as the reinforcement phase through the composition as described above.

In Table 1, examples of alloy compositions in a conventional alloy according to the related art and the high elasticity aluminum alloy according to an exemplary embodiment of the present invention are shown.

Further, when the composition ratio of Ti and B is about 3.5:1 or greater, the $Al_3Ti$ phase may be formed. Meanwhile, the composition ratio of Ti and B is about 7:1 or greater, the melting point of the alloy may be about 800° C. or greater. Therefore, it may be appreciated from the results as described above that when the composition ratio of Ti and B is from about 3.5 to about 6:1, the $Al_3Ti$ phase which may improve elasticity may be obtained, and at the same time, the melting point may be maintained less than about 800° C. Accordingly, the castability may be improved and the inclusion and gas defect may be suppressed. When the melting point is elevated to about 800° C. or greater, flowability of the molten metal may deteriorate and gas and oxides may be included in a product due to a high temperature, to thereby have negative influences on the products and cause a defect in the product. Therefore, for a general casting condition, the melting point may be controlled to be less than about 800° C.

TABLE 1

|  |  | Si (wt %) | Fe (wt %) | Cu (wt %) | Mn (wt %) | Mg (wt %) | Ni (wt %) | Zn (wt %) | Ti (wt %) | B (wt %) | Al (wt %) |
|---|---|---|---|---|---|---|---|---|---|---|---|
| Conventional alloy according to the related art | ADC 12(High pressure casting) | 12 | 1.3 | 2.5 | 0.5 | 0.3 | 0.5 | 1 | 0.3 or less | — | Bal. |
|  | AC4CH(Gravity/Low pressure casting) | 7 | 0.2 | 0.2 | 0.1 | 0.35 | 0.05 | 0.1 | 0.2 or less | — | Bal. |
| Present invention | Main element | 5~13 | — | — | — | — | — | — | 4~6 | 1~2 | Bal. |
|  | ADC12 Application example | 12 | 1.3 | 2.5 | 0.5 | 0.3 | 0.5 | 1 | 4~6 | 1~2 | Bal. |
|  | AC4CH Application example | 7 | 0.2 | 0.2 | 0.1 | 0.35 | 0.05 | 0.1 | 4~6 | 1~2 | Bal. |

In Table 2, results of an experiment of using Al as a base material and adding Si, Ti, and B thereto to confirm an effect of the Ti and B with respect to the aluminum alloy according to the present invention are shown.

FIG. 1 shows a microscopic view of an exemplary Al-12Si-1B-5Ti alloy according to an exemplary embodiment of the present invention. The aluminum alloy may include simultaneously the $Al_3Ti$ and $TiB_2$ phases.

TABLE 2

|  |  | Al (wt %) | Si (wt %) | $TiB_2$ (wt %) | $AlB_2$ (wt %) | $Al_3Ti$ (wt %) | Elastic modulus (GPa) | Melting point (° C.) |
|---|---|---|---|---|---|---|---|---|
| Detailed characteristics | Reinforcement phase elastic modulus | 66.3 | 161 | 570 | 234 | 220 | — | — |
|  | Density (g/cm³) | 2.7 | 2.33 | 4.49 | 3.16 | 3.3 | — | — |
| Ti and B-Free | Al—12Si | 88.05 | 11.95 |  |  |  | 74 | 581 |
| Ti/B = 1 | Al—12Si—1B—1Ti | 84.87 | 11.41 | 1.68 | 2.04 | — | 77 | 578 |
| Ti/B = 2.3 | Al—12Si—1B—2.3Ti | 84.7 | 11.48 | 3.74 | — | — | 79 | 579 |
| Ti/B = 3.5 | Al—12Si—1B—3.5Ti | 81.9 | 11.54 | 3.76 | — | 2.8 | 80 | 650 |
| Ti/B = 5 | Al—12Si—1B—5Ti | 77.46 | 11.95 | 3.21 | — | 7.37 | 83 | 735 |
| Ti/B = 6 | Al—12Si—1B—6Ti | 74.77 | 11.96 | 3.21 | — | 10.06 | 85 | 780 |
| Ti/B = 7 | Al—12Si—1B—7Ti | 72.07 | 11.96 | 3.21 | — | 12.76 | 87 | 800 |
| Ti/B = 8 | Al—12Si—1B—8Ti | 69.37 | 11.96 | 3.21 | — | 15.46 | 89 | 842 |
| Ti/B = 9 | Al—12Si—1B—9Ti | 66.68 | 11.96 | 3.21 | — | 18.15 | 91 | 865 |

As shown in Table 2, when Ti and B were not included, elasticity of the alloy may be substantially reduced.

In Table 3, test results are obtained by comparing elastic modulus and melting points of a conventional ADC12 alloy in the related art and an exemplary aluminum alloy according to an exemplary embodiment of the present invention while changing the composition ratio of the Ti and B.

Figure 3:
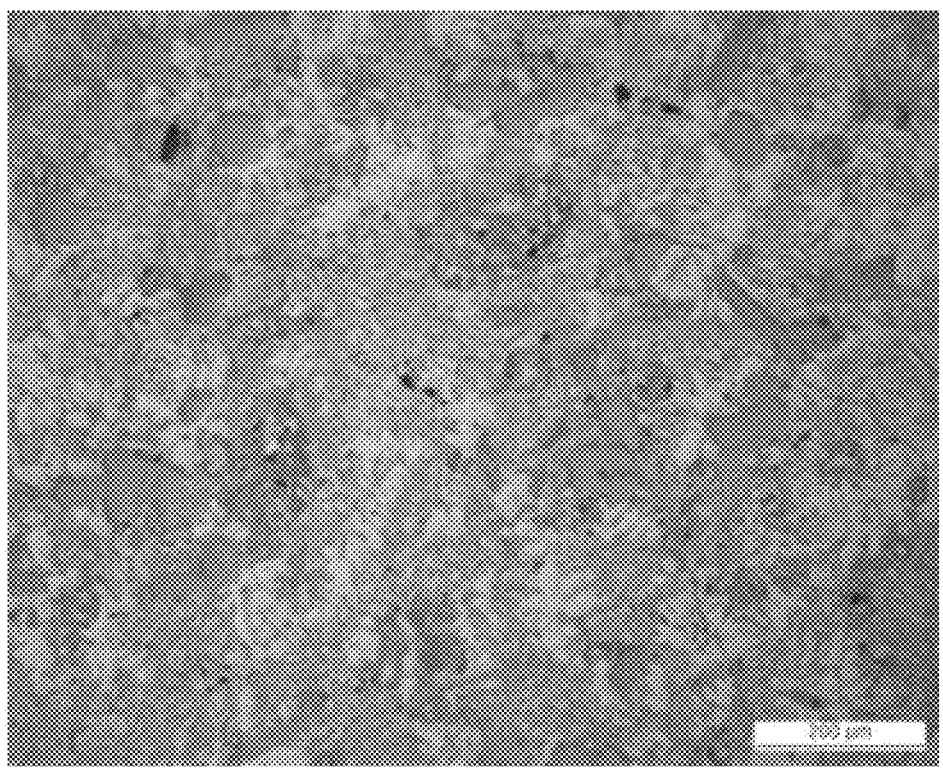
FIG. 3 shows a microscopic view of an exemplary aluminum alloy an exemplary embodiment of the present invention in which Sb is added to the aluminum alloy.

As shown in FIG. 3, in an exemplary high elasticity aluminum alloy according to an exemplary embodiment of the present invention, eutectic Si particles may be miniatur-

TABLE 3

|  |  | Al | Si | $Al_7Cu_4Ni$ | $TiB_2$ | $AlB_2$ | $Al_3Ti$ | $Al_5Cu_2Mg_8Si_6$ | β | α | Elastic modulus (GPa) | Melting point (° C.) |
|---|---|---|---|---|---|---|---|---|---|---|---|---|
| Detailed characteristics | Elastic modulus (GPa) | 66.3 | 161 | 245 | 564 | 234 | 220 | 245 | 195 | 298 | — | — |
|  | Density (g/cm³) | 2.7 | 2.33 | 4.83 | 4.49 | 3.16 | 3.3 | 2.76 | 3.55 | 3.54 | — | — |
| Commercialized alloy | ADC12 | 78.6 | 11.28 | 4.27 | — | — | — | 0.91 | 0.11 | 4.9 | 78 | 635 |
| Ti/B = 1 | ADC12-1B—1Ti | 76.3 | 11.08 | 2.84 | 1.7 | 2.11 | — | 0.85 | 0.49 | 4.54 | 86 | 640 |
| Ti/B = 2.3 | ADC12-1B—2.3Ti | 76.2 | 11.14 | 2.86 | 3.88 | — | 0.1 | 0.85 | 0.48 | 4.56 | 88.0 | 640 |
| Ti/B = 3.5 | ADC12-1B—3.5Ti | 73.2 | 11.21 | 2.87 | 3.9 | — | 2.91 | 0.86 | 0.47 | 4.59 | 90 | 660 |
| Ti/B = 5 | ADC12-1B—5Ti | 68.0 | 11.3 | 4.27 | 3.21 | — | 7.38 | 0.91 | 0.04 | 4.9 | 94 | 742 |
| Ti/B = 6 | ADC12-1B—6Ti | 65.3 | 11.3 | 4.27 | 3.21 | — | 10.08 | 0.91 | 0.02 | 4.9 | 97 | 781 |
| Ti/B = 7 | ADC12-1B—7Ti | 62.7 | 11.3 | 4.27 | 3.21 | — | 12.78 | 0.92 | — | 4.9 | 99 | 813 |
| Ti/B = 8 | ADC12-1B—8Ti | 59.9 | 11.3 | 4.27 | 3.21 | — | 15.47 | 0.92 | — | 4.89 | 101 | 840 |
| Ti/B = 9 | ADC12-1B—9Ti | 57.2 | 11.3 | 4.27 | 3.21 | — | 18.17 | 0.92 | — | 4.87 | 104 | 865 |

The conventional ADC12 alloy contains Ti in an amount of about 0.3 wt % or less and B is not added. In Examples of Table 3, according to an exemplary embodiment of the invention, a composition ratio of Ti and B is changed in a composition of the conventional ADC12 alloy as described above, the content of Si in the conventional ADC12 alloy is maintained. For example, ADC12-1B-5Ti indicates an aluminum alloy obtained by adjusting the composition so that B is included in an amount of about 1 wt %, Ti is included in an amount of about 5 wt %, other addition elements are equal to those of the conventional ADC12, and the remainder is Al in Examples of the present invention.

In other aspect, a method for producing an aluminum alloy is provided.

In an exemplary embodiment, the method may include steps of: a charging step of charging Al, an Al—B mother alloy, an Al—Ti mother alloy, or a Ti raw material in a melting furnace; a primary stirring step of stirring molten metals such that both of $Al_3Ti$ and $TiB_2$ phases are formed as a reinforcement phase; an addition step of charging remaining addition elements except for Ti and B; and a secondary stirring step of stirring the molten metals such that the formed reinforcement phase is uniformly dispersed in the molten metals.

In certain exemplary embodiments, the Al—B mother alloy may consist of B in an amount of about 3 to 8 wt % and the remainder of Al. Further, the Al—Ti mother alloy may consist of Ti in an amount of about 5 to 10 wt % and the remainder of Al. In yet certain exemplary embodiments, as the Ti raw material, a 100 wt % Ti raw material or a high concentration Ti raw material having Ti content of about 75 to 95 wt % to which sodium-free flux and the like is added as a reaction activator may be used without limitation. In still certain exemplary embodiments, a Ti raw material having a content of Ti of about 75 wt % is used.

Figure 2:
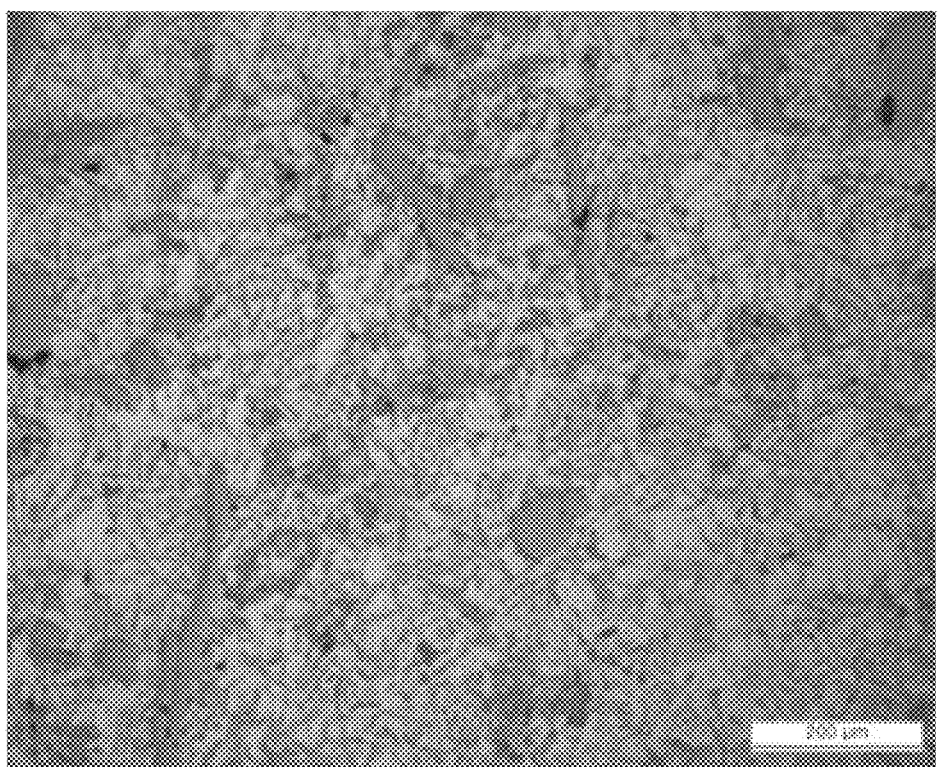
FIG. 2 shows a microscopic view of an exemplary aluminum alloy an exemplary embodiment of the present invention in which Sb is not added to the aluminum alloy.

Particularly, Sb may be included at a content of about 0.3 wt % or less but greater than 0 wt %.

ized or modified due to addition of about 0.3 wt % Sb. In addition, elongation may be improved without deteriorating physical properties through miniaturization of the eutectic Si particles. FIG. 2 shows an exemplary high elasticity aluminum alloy in which Sb is not included, and FIG. 3 shows an exemplary high elasticity aluminum alloy in which Sb is included. Accordingly, Sb that does not react with B may be used as a modifier in order to improve elongation of the high elasticity alloy. In certain exemplary embodiments, an effective amount of Sb without deterioration of physical properties from excessive use thereof may be of about 0.3 wt %.

Meanwhile, in the stirring during the process, a specification of the stirrer may be significantly important. Generally, stirring force is in proportion to $N^3d^2$ when N is revolution per minute and d is diameter of a stirring bar.

In certain exemplary embodiments, the number of blade of the stirring bar may be changed from 8 to 4 and a length thereof may be elongated in order to maximize turbulence. In particular, the stirring bar may account for about at least 40% of a diameter of the melting furnace, and the diameter of the stirring bar may be also increased from about 18 cm to about 24 cm, such that dispersion may be maximized. In yet certain exemplary embodiment, a stirring rate may be about 500 rpm or greater. Since the diameter and rate of the stirring bar influence reaction promotion and dispersion of the formed reinforcement particles, the diameter may be of about 40% or greater of the diameter of the melting furnace. When the stirring rate is 500 rpm or less, flowability of the product may deteriorate due to remaining coarse $Al_3Ti$, a elasticity may decreased due to a deficiency in amount of formed $TiB_2$, and a deviation depending on molten metal zones and the like may occur.

In various exemplary embodiments of the present invention, properties such as elasticity, strength, abrasion resistance, processability and the like of the aluminum alloy may be improved by controlling the composition ratio to optimize the titanium compound, such that the formation of the titanium compound may be maximized, a micro $TiB_2$ phase may be uniformly distributed and the $Al_3Ti$ phase may be simultaneously formed. Further, the aluminum alloy in the present invention may have a temperature range capable of being applied to an actual casting process, such that the reinforcement phase which is charged in a mother alloy form may be formed by an in-situ reaction through reaction promotion by stirring at the time of dissolution. Therefore, any type of the general used casting processes may be applicable to the aluminum alloy of the present invention.

The present invention also provide a vehicle part comprising the high elasticity aluminum alloy of the invention.

According to various exemplary embodiments, the high elasticity aluminum alloy may include a titanium compound having the above-mentioned structure and the $Al_3Ti$ and $TiB_2$ phases may be simultaneously included as the reinforcement phase. As such, elasticity may be improved, and at the same time, the melting point of the alloy of the invention may be maintained, thereby suppressing the inclusion and gas defect and improving castability.

While the exemplary embodiment of the present invention has been shown and described, it will be apparent to those skilled in the art that modifications and variations can be made without departing from the spirit and scope of the invention as defined by the appended claims.

What is claimed is:

1. An aluminum alloy including a titanium compound, comprising Ti and B, wherein a composition ratio of Ti and B is in a range from about 3.5 to about 6:1, B is included at a content of about 0.5 to 2 wt % based on the total weight of the aluminum alloy, and both of $Al_3Ti$ and $TiB_2$ phases are included as a reinforcement phase,
    wherein $Al_3Ti$ phases are included in an amount of about 2.8 to 10.06% therein,
    wherein $TiB_2$ phases are included in an amount of about 3.21 to 3.76% therein,
    wherein a melting point of the aluminum alloy is less than 800° C.

2. An automotive vehicle part comprising an aluminum alloy of claim 1.

3. An aluminum alloy including a titanium compound, comprising:
    silicon in an amount of about 5.0 to 13.0 wt %;
    iron in an amount of about 0.0 to 1.3 wt %;
    manganese in an amount of about 0.0 to 0.5 wt %;
    magnesium in an amount of about 0.0 to 0.3 wt %;
    zinc in an amount of about 0.0 to 1.0 wt %;
    nickel in an amount of about 0.0 to 0.5 wt %;
    tin in an amount of about 0.0 to 0.3 wt %;
    copper in an amount of about 1.5 to 3.5 wt %;
    boron (B) in an amount of about 0.5 to 2 wt %;
    titanium (Ti) included such that a composition ratio of Ti and B is in a range from about 3.5 to about 6:1; and
    aluminum as the remainder,
    based on the total weight of the aluminum alloy,
    wherein both of $Al_3Ti$ and $TiB_2$ phases are included therein as a reinforcement phase,
    wherein $Al_3Ti$ phases are included in an amount of about 2.91 to 10.08% therein,
    wherein $TiB_2$ phases are included in an amount of about 3.21 to 3.9% therein,
    wherein a melting point of the aluminum alloy is less than 800° C.

4. The aluminum alloy of claim 3, consisting essentially of:
    silicon in an amount of about 5.0 to 13.0 wt %;
    iron in an amount of about 0.0 to 1.3 wt %;
    manganese in an amount of about 0.0 to 0.5 wt %;
    magnesium in an amount of about 0.0 to 0.3 wt %;
    zinc in an amount of about 0.0 to 1.0 wt %;
    nickel in an amount of about 0.0 to 0.5 wt %;
    tin in an amount of about 0.0 to 0.3 wt %;
    copper in an amount of about 1.5 to 3.5 wt %;
    boron (B) in an amount of about 0.5 to 2 wt %;
    titanium (Ti) included such that a composition ratio of Ti and B is in a range from about 3.5 to about 6:1; and
    aluminum as the remainder,
    based on the total weight of the aluminum alloy.

5. The aluminum alloy of claim 3, wherein antimony (Sb) is included in an amount of about 0.3 wt % or less but greater than 0 wt %.

6. The aluminum alloy of claim 5, consisting essentially of:
    silicon in an amount of about 5.0 to 13.0 wt %;
    iron in an amount of about 0.0 to 1.3 wt %;
    manganese in an amount of about 0.0 to 0.5 wt %;
    magnesium in an amount of about 0.0 to 0.3 wt %;
    zinc in an amount of about 0.0 to 1.0 wt %;
    nickel in an amount of about 0.0 to 0.5 wt %;
    tin in an amount of about 0.0 to 0.3 wt %;
    copper in an amount of about 1.5 to 3.5 wt %;
    boron (B) in an amount of about 0.5 to 2 wt %;
    titanium (Ti) included such that a composition ratio of Ti and B is in a range from about 3.5 to about 6:1;
    antimony (Sb) in an amount of about 0.3 wt % or less but greater than 0 wt %, and
    aluminum as the remainder,
    based on the total weight of the aluminum alloy.

7. A method for producing a high elasticity aluminum alloy including a titanium compound, comprising steps of:
    a charging step of charging Al, an Al—B mother alloy, an Al—Ti mother alloy, or a Ti raw material in a melting furnace, a composition ratio of Ti and B being in a range from about 3.5 to about 6:1, and B being included in an amount of about 0.5 to about 2 wt %, based on the total weight of the high elasticity aluminum alloy;
    a primary stirring step of stirring molten metals such that both of $Al_3Ti$ and $TiB_2$ phases are formed inside as a reinforcement phase to promote a reaction;
    an addition step of charging addition elements; and
    a secondary stirring step of stirring the molten metals such that the formed reinforcement phase is uniformly dispersed in the molten metals.

8. The method of claim 7, wherein the Al—B mother alloy consists of: B in an amount of about 3 to 8 wt % B and the remainder of Al.

9. The method of claim 7, wherein the Al—Ti mother alloy consists of: Ti in an amount of about 5 to 10 wt % and the remainder of Al.

10. The method of claim 7, wherein Sb is included in an amount of about 0.3 wt % or less but greater than 0 wt %, based on the total weight of the high elasticity aluminum alloy.

* * * * *